United States Patent
Yokose (10) Patent No.: US 7,039,249 B2
(45) Date of Patent: May 2, 2006

(54) CODE CONVERTER, ENCODER, IMAGE OUTPUT DEVICE AND METHOD THEREOF

(75) Inventor: Taro Yokose, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 459 days.

(21) Appl. No.: 10/096,846

(22) Filed: Mar. 14, 2002

(65) Prior Publication Data

US 2003/0044079 A1    Mar. 6, 2003

(30) Foreign Application Priority Data

Sep. 6, 2001   (JP) .............................. 2001-270186

(51) Int. Cl.
  *G06K 9/36*  (2006.01)
  *G06K 9/46*  (2006.01)

(52) U.S. Cl. ...................... 382/246; 382/253

(58) Field of Classification Search ................ 382/232, 382/233, 239, 245, 246, 248, 251, 253; 341/59, 341/65, 67; 711/200; 375/240.22, 240.23, 375/240.25
See application file for complete search history.

(56) References Cited

U.S. PATENT DOCUMENTS

| | | | | |
|---|---|---|---|---|
| 5,173,695 A | * | 12/1992 | Sun et al. | |
| 5,436,626 A | * | 7/1995 | Fujiwara et al. | |
| 5,600,812 A | * | 2/1997 | Park | |
| 5,663,726 A | * | 9/1997 | Bakhmutsky | |
| 5,666,116 A | * | 9/1997 | Bakhmutsky | |
| 5,675,332 A | * | 10/1997 | Limberg | |
| 5,696,507 A | * | 12/1997 | Nam | |
| 5,966,470 A | * | 10/1999 | Miyashita et al. | |
| 6,252,992 B1 | * | 6/2001 | Ishikawa | |
| 6,580,377 B1 | * | 6/2003 | Du et al. | |

FOREIGN PATENT DOCUMENTS

| | | |
|---|---|---|
| JP | 06-152434 | 5/1994 |
| JP | 08-084340 | 3/1996 |
| JP | 09-046236 | 2/1997 |
| JP | 09-093133 | 4/1997 |
| JP | A 9-93133 | 4/1997 |
| JP | 2002-171488 | 6/2002 |

* cited by examiner

*Primary Examiner*—Andrew W. Johns
*Assistant Examiner*—Amir Alavi
(74) *Attorney, Agent, or Firm*—Oliff & Berridge, PLC

(57) ABSTRACT

Conversion between different codes can be implemented at high speed by a small device. A code input unit inputs a code. A compatible information reference unit refers to compatible information of each compressed symbol before and after code conversion, which then sends out compatible information data to a compressed symbol conversion unit. The compressed symbol conversion unit converts each of the compressed symbols in the input code data to a form adapted to a code to be converted based on the compatible information data, which then sends out converted code data to a converted code output unit.

19 Claims, 11 Drawing Sheets

| QUANTIZED VALUE BEFORE CONVERSION | REVERSE QUANTIZED RESULT | QUANTIZED VALUE AFTER CONVERSION |
|---|---|---|
| 0 | 0 | 0 |
| 1 | 3 | 1 |
| 2 | 6 | 1 |
| 3 | 9 | 2 |
| 4 | 12 | 2 |
| ... | ... | ... |

FIG. 4

| CODE BEFORE CONVERSION | RUN VALUE | CODE AFTER CONVERSION |
|---|---|---|
| 0 | 1 | 000 |
| 10 | 2 | 001 |
| 110 | 3 | 010 |
| 1110 | 4 | 011 |
| 11110 | 5 | 100 |
| ... | ... | ... |

FIG. 5

| CODE BEFORE CONVERSION | RUN VALUE BEFORE CONVERSION | RUN VALUE AFTER CONVERSION | CODE AFTER CONVERSION |
|---|---|---|---|
| 0 | 1 | 1 | 00 |
| 10 | 2 | 2 | 01 |
| 110 | 3 | 3 | 1 |
| 1110 | 4 | 3 + 1 | 1 00 |
| 11110 | 5 | 3 + 2 | 1 01 |
| ... | ... | ... | ... |

| CODEWORD BEFORE CONVERSION | | PIXEL VALUE | CODEWORD AFTER CONVERSION |
|---|---|---|---|
| A | B | | |
| 0 | 10 | 0 | 00 |
| 110 | 110 | 1 | 01 |
| 111 | 111 | 2 | 10 |
| 10 | 0 | 3 | 11 |

FIG. 9B

| CODEWORD BEFORE CONVERSION | RUN | CODEWORD AFTER CONVERSION |
|---|---|---|
| 0 | 1 | 001 |
| 10 | 2 | 010 |
| 110 | 3 | 011 |
| 1110 | 4 | 100 |
| 11110 | 5 | 101 |
| 11111 | 6 | 110 |

FIG. 9C

| CODEWORD BEFORE CONVERSION | ADDITIONAL INFORMATION | CODEWORD AFTER CONVERSION |
|---|---|---|
| 00 | SOI | 00 |
| 01 | EOI | 01 |
| 10 | DHTA | 10 |
| 11 | DHTB | 11 |

FIG. 10

| COMPRESSED SYMBOL | SOI | PIXEL VALUE 0 | RUN 4 | PIXEL VALUE 1 | RUN 1 | DHTB | PIXEL VALUE 3 | RUN 3 |
|---|---|---|---|---|---|---|---|---|
| CODE BEFORE CONVERSION | 00 | 0 | 1110 | 110 | 0 | 11 | 0 | 110 |
| CODE AFTER CONVERSION | 00 | 00 | 100 | 01 | 001 | 11 | 11 | 011 |

CODE CONVERTER, ENCODER, IMAGE OUTPUT DEVICE AND METHOD THEREOF

BACKGROUND OF THE INVENTION

1. Field of the Invention

The present invention relates to a compression technique, more specifically to code mutual conversion in different encoding methods.

2. Description of the Related Art

When performing communication or storage of a large amount of data including an image, the data may be compressed to reduce the amount of the data. This technique is hereinafter referred to as encoding.

Depending on each application, there are many encoding methods. With the same method, a parameter may be adjusted corresponding to an object. Typical examples of an encoding parameter include a quantizing coefficient and a Huffman code. Code compatibility may be deteriorated depending on the parameter.

In the case of an encoding method (hereinafter, referred to as JPEG) standardized by JPEG (Joint Photographic Experts Group), Huffman encoding and arithmetic encoding can be used for entropy encoding. The entropy encoding should be selected from the balance between compression ratio and process complexity, which may be one of the abovementioned encoding parameters. Typical compatibility does not exist in both.

Japanese Published Unexamined Patent Application No. Hei 9-93133 which is a related art to solve a similar problem to this will be described as a related art. The related art has the problems of, in moving image encoding, mutual conversion between MPEG and H0.261 and conversion of bit rate or frame rate in the same format. A code using frequency conversion is generally referred to as a changed code. Unless otherwise specified, a code which is converted to be matched with a predetermined object as described above is hereinafter referred to as a converted code.

Figure 12:
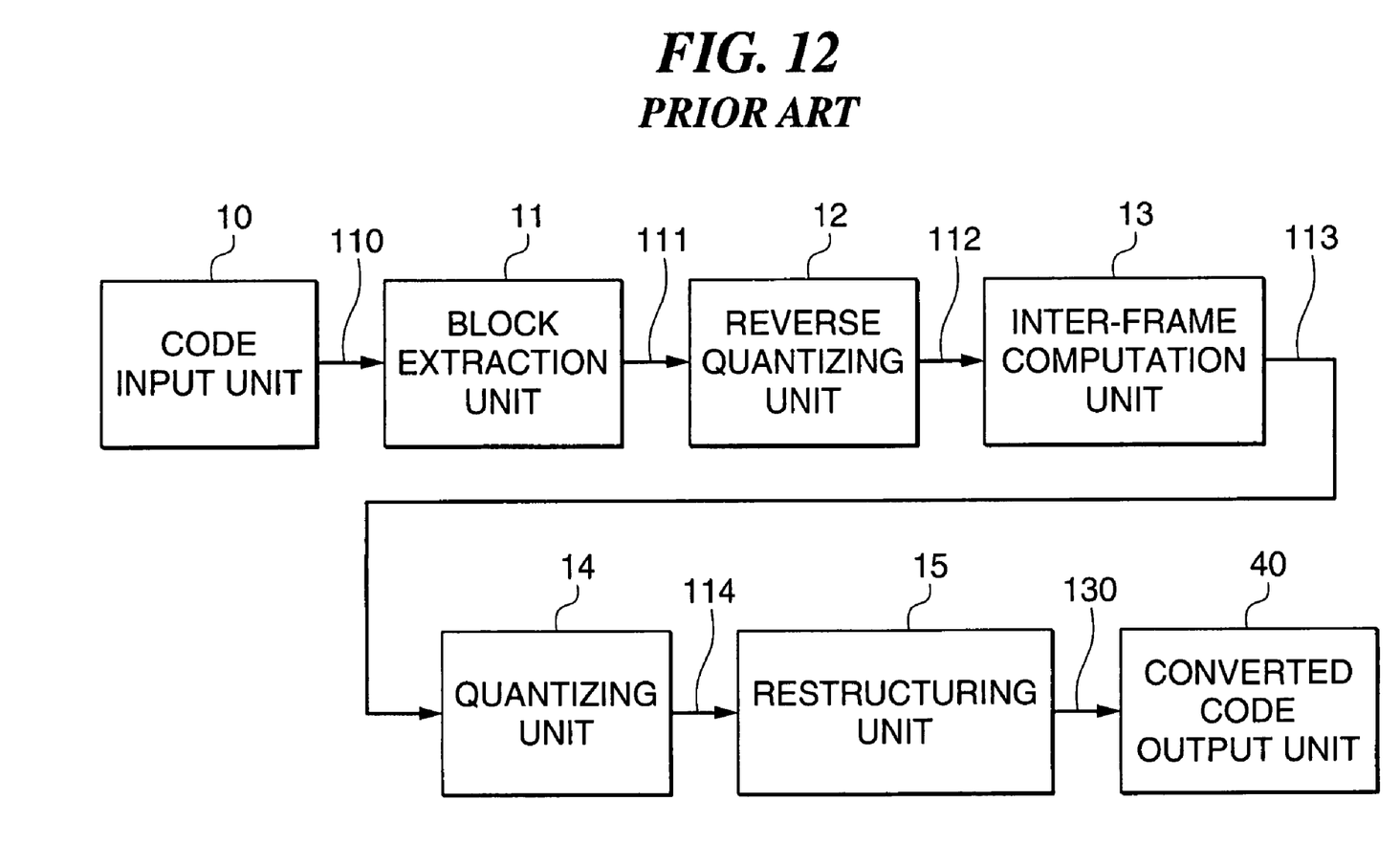
FIG. 12 is a block diagram showing a code converter of a related art.

FIG. 12 is a configuration example of a related art encoder. The terms are partially changed so as to be matched along the purpose of the description of the present invention, which is not related to their nature. In the drawing, the numeral 10 denotes a code input unit, the numeral 11 denotes a block extraction unit, the numeral 12 denotes a reverse quantizing unit, the numeral 13 denotes an inter-frame computation unit, the numeral 14 denotes a quantizing unit, the numeral 15 denotes a restructuring unit, the numeral 40 denotes a converted code output unit, the numeral 110 denotes input code data, the numeral 111 denotes quantized data, the numerals 112 and 113 denote converted data, the numeral 114 denotes re-quantized data, and the numeral 130 denotes converted code data.

The respective parts of FIG. 12 will be described. The image encoder of FIG. 12 is configured as follows. The image input unit 10 receives a code from outside, which then sends out the input code data 110 to the block extraction unit 11. The block extraction unit 11 extracts a block from the input code data 110, which then sends out the quantized data 111 to the reverse quantizing unit 12. The reverse quantizing unit 12 performs predetermined reverse quantizing, which then sends out the converted data 112 to the inter-frame computation unit 13. The inter-frame computation unit 13 performs predetermined inter-frame computation, which then sends out the converted data 113 to the quantizing unit 14. The quantizing unit 14 performs predetermined quantizing, which then sends out the re-quantized data 114 to the restructuring unit 15. The restructuring unit 15 performs restructuring to a predetermined code format, which then sends out the converted code data 130 to the converted code output unit 40. The converted code output unit 40 sends out the converted code data 130 outside.

Figure 13:
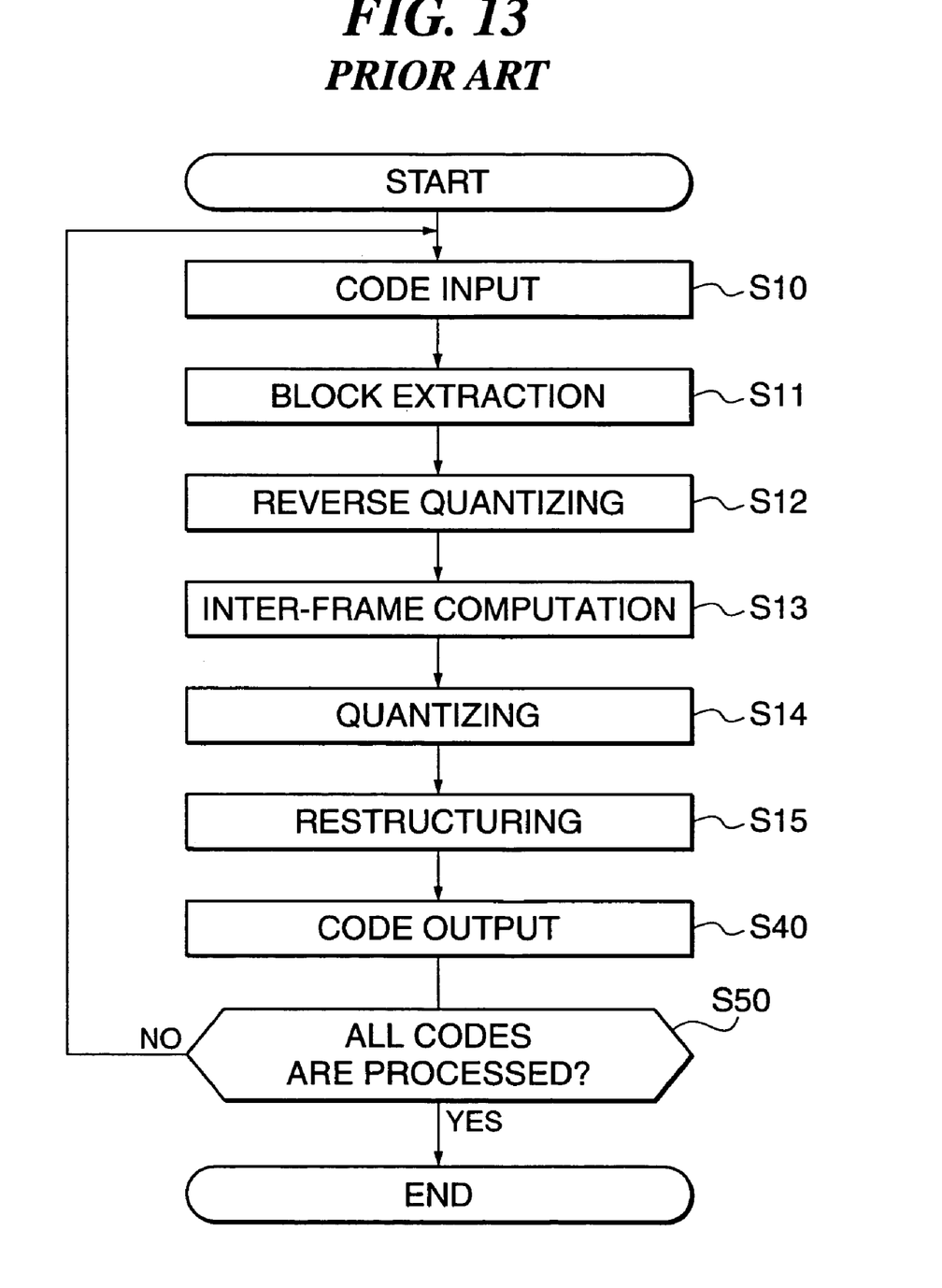
FIG. 13 is a flowchart showing one example of the operation of the code converter of the related art.

The operation of the related art based on the above configuration will be described. FIG. 13 is a flowchart showing the operation of the image encoder of the related art. The operation of the related art will be described below using FIG. 13. In S10, the code input unit 10 inputs a code from outside. In S11, the block extraction unit 11 extracts a block. In S12, the reverse quantizing unit 12 performs reverse quantizing. In S13, the inter-frame computation unit 13 performs inter-frame computation. In S14, the quantizing unit 14 performs quantizing. In S15, the restructuring unit 15 restructures the code. In S40, the converted code output unit 40 outputs the converted code. In S50, when there is an unprocessed code, the routine is advanced to S10. Otherwise, the entire process is terminated.

In the above operation, the related art includes, as the inter-frame computation, frame rate conversion and bit rate conversion.

The problems of the related art will be described. The related art intends to make conversion of the codes faster by omitting frequency conversion and reverse conversion. However, since reverse quantizing is performed in S12, the inter-frame computation in S13 must process an enormous amount of data. As a result, the related art can-be faster than a converting process with frequency conversion while processing of the amount of uncompressed data cannot be improved. The increased amount of processed data results in longer processing time and a larger device.

As the abovementioned problems of the related art, since the amount of processed data is large, the processing time is longer and a device is larger.

SUMMARY OF THE INVENTION

The present invention has been made in view of the above circumstances and provides a code converter which is of a small and simplified configuration and can convert a code and an encoder.

According to one aspect of the present invention, a code converter includes: a code input part which inputs a code; a compatible information reference part which refers to compatible information; a conversion part which converts the input code based on the compatible information; and a code output part which outputs a converting result of the conversion part, wherein, to ensure compatibility between at least two codes, a correspondence between compressed symbols before and after conversion is described into the compatible information, whereby the conversion part converts the symbols while keeping them compressed.

The configuration can perform code conversion in a compressed symbol form. Code conversion can be performed by a small and simplified configuration.

In the code converter, the conversion part includes a codeword cutting part which cuts out a codeword from the input code, a codeword substitution part which substitutes the cut codeword, and a codeword coupling part which couples the codeword substituted by the codeword substitution part to generate a code.

According to another aspect of the present invention, an encoder includes: a data input part which inputs data; a compatible information reference part which refers to compatible information; an encoding part which encodes the input data by a predetermined method based on the compatible information; and a code output part which outputs an encoding result of the encoding part, wherein a component of a compressed symbol to be encoded necessary to ensure compatibility between at least two codes is described into the compatible information, whereby the encoding part performs encoding which facilitates conversion.

The configuration describes information suitable for code conversion performed later, for example, whether a compressed symbol for initializing a state variable is used or not, and thus, can optimize or permits code conversion performed later.

In the encoder, the encoding part includes a symbol generation part which generates a symbol from the input data, a codeword substitution part which substitutes a codeword for the generated symbol, and a codeword coupling part which couples the codeword to generate a code.

According to another aspect of the present invention, an image output device includes: an image input part which inputs an image; a compatible information reference part which refers to compatible information; an encoding part which encodes the input image based on the compatible information; at least one conversion part which converts the code based on the compatible information to generate a converted code; a code decoding part which decodes the code; at least one converted code decoding part which decodes the converted code; an image output part which outputs a decoding result of the code decoding part; and at least one image output part which outputs a decoding result of the corresponding at least one converted code decoding part, wherein a component of a compressed symbol to be encoded necessary to ensure compatibility between at least two codes is described into the compatible information, whereby the encoding part performs encoding which facilitates conversion, and a correspondence between compressed symbols before and after conversion is described into the compatible information, whereby the conversion part converts the symbols while keeping them compressed.

In the configuration, the image output part (printing device) corresponding to different encoding methods generates a converted code by code conversion without performing re-encoding, and thus, the image output part can simply and reliably perform image output.

In the configuration, in some cases, the image output part (printing device) which decodes and outputs the input code is not used.

In the image output device, the code may be converted by the conversion part before or after a code managing process such as storage or transmission.

In the image output device, the compatible information reference parts for the encoding part and the conversion part are prepared independently, thereby storing only necessary information.

The image output device (printing device) and the code output side perform negotiation to, upon request or previously, discriminate whether code conversion can correspond to the code. Based on this, whether the code is supplied as it is or it is adapted to the printing device for re-encoding may be decided.

The compatible information reference part may have a look-up table or a multistage look-up table through virtual representation.

The compatible information reference part may use a predetermined relational expression to calculate a relation between the symbols by computation.

When one of objects of code conversion is quantizing coefficient conversion, the compatible information may show a relation between quantizing results by different quantizing coefficients.

When one of objects of code conversion is codeword conversion, the compatible information may show a relation between codewords in different codes.

The codeword may be a Huffman code.

When one of objects of code conversion is maximum run length conversion, the compatible information may show a relation between run values in different maximum run lengths.

When code conversion has plural objects, the compatible information may be parallelized or logically combined plural pieces of compatible information.

In the code converter, the encoder or the image output device, when symbols described into the compatible information are not independent on the code, the conversion part may include a symbol cutting part which cuts out the described symbols.

In the code converter, the encoder or the image output device, even additional information is useful only for specific encoding, the additional information is described into the compatible information and included in a code.

In the code converter, the encoder or the image output device, additional information which is useful only for specific encoding may not be described into the compatible information when it is known that no later code conversion is performed, and the additional information may be removed from a code.

In the code converter, the encoder or the image output device, the compatible information reference unit may change the compatible information to be described to control setting of the compatible information reference unit according to a peripheral condition.

The present invention can be implemented not only as a device or a system but also as a method. Naturally, at least part of it can be a storage medium for storing a computer program.

The abovementioned aspects of the present invention and other aspects of the present invention are specifically described in claims, and will be described below in detail using embodiments.

BRIEF DESCRIPTION OF THE DRAWINGS

Preferred embodiments of the present invention will be described in detail based on the followings, wherein.

PREFERRED EMBODIMENTS OF THE INVENTION

Before specifically describing embodiments of the present invention, the basic principles of the present invention will be described.

Typical encoding has a source coder which reduces redundancy from the nature of input data and an entropy coder which reduces probabilistic redundancy regardless of the type of input data. Examples of the source coder include DCT used in JPEG and a predicting process used in image predictive encoding. The output of such a source coder is called a symbol.

The symbol is broadly divided into two. One is a compressed symbol subjected to some compression, and the other is a non-compressed symbol not subjected to compression. The term compression herein solely means reduction of the amount of data and includes not only reversible compression but also reduction of redundancy by quantizing.

The source coder is applied to both the compressed symbol and the non-compressed symbol. Conversion to an encoding method with different source coders is thus difficult. In the non-compressed symbol, however, conversion to an encoding parameter in the same encoding method can be done relatively easily. This shows that dependence of the non-compressed symbol to the encoding method is relatively low. On the contrary, in the compressed symbol having higher dependence to the encoding method, change to the encoding parameter is difficult.

In the related art, data before reverse quantizing corresponds to the compressed symbol and data after reverse quantizing corresponds to the non-compressed symbol. In the related art configuration, since conversion is difficult in the compressed symbol, a reverse quantizing process, that is, a process for returning to the non-compressed symbol once-is required.

The present invention performs conversion on the compressed symbol. This can reduce the amount of processed data to implement high-speed processing as well as a smaller device. To implement conversion on the compressed symbol, irrespective of a final code, a code is structured so that the compressed symbol is compatible. That the compressed symbol is compatible is defined so that all the compressed symbols in a code before conversion can be represented by the compressed symbol in a code after conversion, and vice versa. For example, when the compressed symbols correspond with each other on a one-to-one basis before and after conversion, compatibility herein is satisfied clearly. The relation between them may be on a many-to-one or many-to-many basis. When the compressed symbol existing in the code before conversion cannot be represented by the compressed symbol of the code after conversion, compatibility is not satisfied.

Since only the efficiency of encoding is considered in the related art, no attention is paid to such compatibility. Even when the efficiency of coding itself is lowered, the present invention puts emphasis on the compatibility.

Specific examples of the present invention will be described in the embodiments. Four embodiments of the present invention will be described below:

(1) an example embodied as a typical code converter;
(2) an example embodied as a typical encoder;
(3) an example applied to image encoding; and
(4) an example embodied as an image output system.

The above description is done assuming source coding. The output of the source coding is handled as a symbol. When not assuming the source coding, broadly, the output before compression is called a non-compressed symbol and the symbol after compression is called a compressed symbol.

[First Embodiment]

Figure 1:
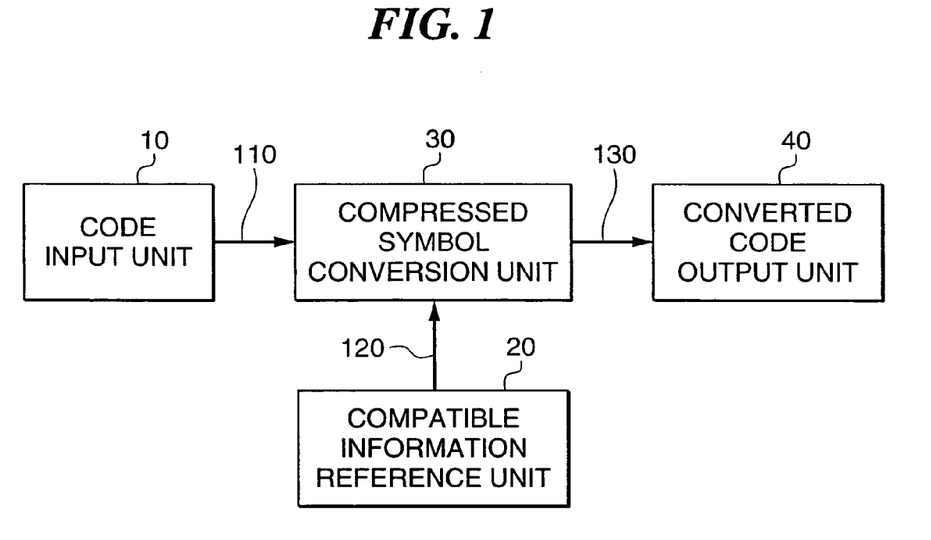
FIG. 1 is a block diagram showing a code converter of a first embodiment of the present invention.

As a first embodiment of the present invention, an example embodied as a typical code converter will be described. The first embodiment of the present invention will be described specifically. FIG. 1 is a block diagram showing a code converter in the first embodiment. In the drawing, the same parts as FIG. 12 are indicated by similar numerals, and the description thereof is omitted. In the drawing, the numeral 20 denotes a compatible information reference unit, the numeral 30 denotes a compressed symbol conversion unit, and the numeral 120 denotes compatible information data.

The respective parts of FIG. 1 will be described. The compatible information reference unit 20 refers to compatible information of each compressed symbol before and after code conversion, which then sends out the compatible information data 120 to the compressed symbol conversion unit 30. The compressed symbol conversion unit 30, based on the compatible information data 120, converts each of the compressed symbols in input code data 110 to a form to be adapted to a code to be converted, which then sends out converted code data 130 to a converted code output unit 40.

Figure 2:
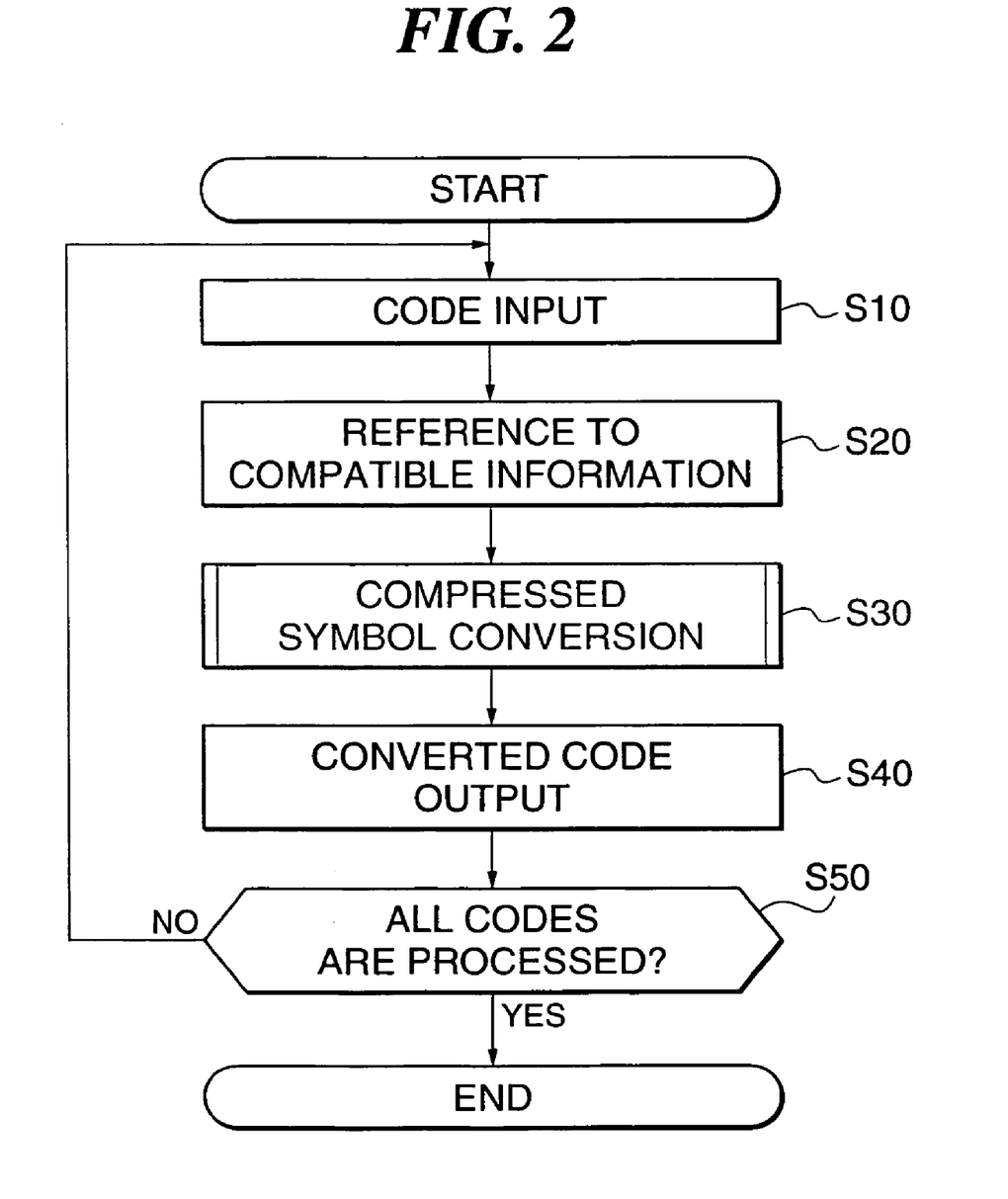
FIG. 2 is a flowchart showing one example of the operation of the code converter of the first embodiment of the present invention.

The operation of the first embodiment of the present invention will be described based on the above configuration. FIG. 2 is a flowchart showing code converting operation in the first embodiment. In the drawing, the same parts as FIG. 13 are indicated by similar numerals, and the description thereof is omitted.

Code conversion of the first embodiment of the present invention will be described with FIG. 2. In S20, the compressed symbol conversion unit 30 refers to the compatible information data 120. In S30, the compressed symbol conversion unit 30 performs a compressed symbol converting process.

The compatible information in the above operation will be described. The relation between the compressed symbols in the codes before and after conversion is described into the compatible information. For example, when the compressed symbols correspond with each other on a one-to-one basis, they may be structured by a simple look-up table (hereinafter, referred to as LUT). When the relation between the compressed symbols is on a many-to-one or many-to-many basis, they can be structured likewise. When the efficiency of the storage area is important, an actual symbol is represented by a virtual symbol. In addition to this, they are preferably structured by a multistage LUT, as the relation is described on the virtual symbol. When they can be determined from computation, such representation may be used.

Figure 3:
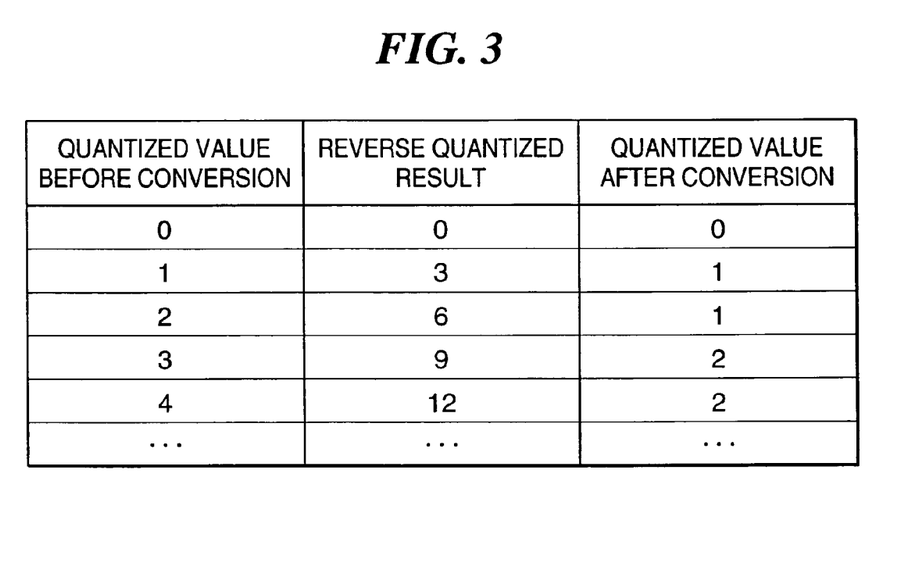
FIG. 3 is an explanatory view of assistance in explaining one example of compatible information of the code converter of the first embodiment of the present invention.

When a quantizing coefficient is changed as in the related art, the previous quantized data value can be directly mapped into a new quantized data value. FIG. 3 is a concept view in such a case. An example in which the quantizing coefficient is converted from 3 to 5 in simple linear quantizing is shown here. The middle section of the reverse quantizing result is added for description, and can be omitted in the actual structure.

Figure 4:
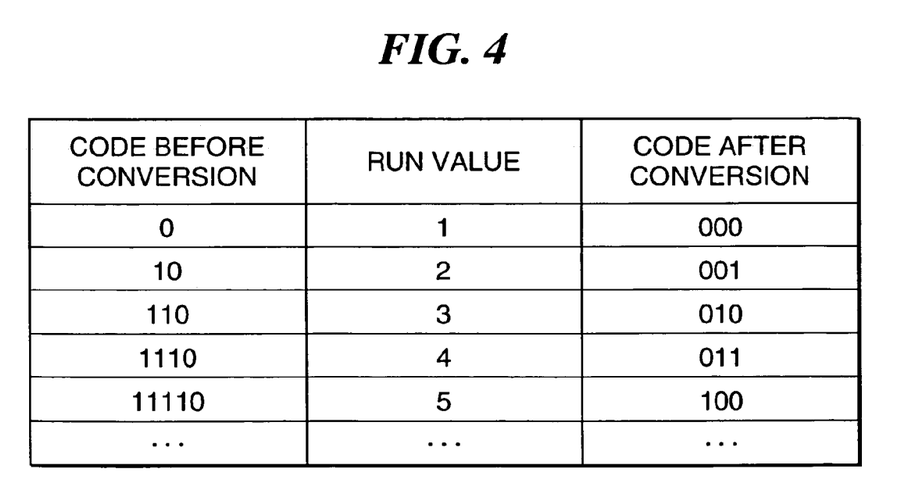
FIG. 4 is an explanatory view of assistance in explaining one example of compatible information of the code converter of the first embodiment of the present invention.

As a second example, codeword conversion will be shown. The term codeword herein means a minimum code component in encoding so that a symbol and a codeword correspond with each other on a one-to-one basis like the so-called Huffman code. Codeword conversion is effective for limiting a maximum codeword length due to hardware limitation. In this case, although detailed description is different, compatible information can be represented by the same LUT as FIG. 3. FIG. 4 is a concept view of compatible information in such a case. The middle section of the run value is added for description, and can be omitted in the actual structure.

As one more example in which the compressed symbols do not correspond with each other on a one-to-one basis, the case where a maximum run length is changed by a run length coder will be shown. For example, suppose that a code designed by a maximum run length r is converted to a code with a maximum run length R, wherein r>R. In this case, although the relation between r and R can be represented by an LUT, the r pieces of entries must be prepared, and r may result in a giant configuration. The compatible information reference unit 20 thus performs the following calculation.

$$a = r/R \quad (1)$$

$$b = r \bmod R \quad (2)$$

Here, mod is computation for determining an excess. The compressed symbol conversion unit 30 refers to the results of equations (1) and (2) as the compatible information data 120 so as to divide run to be a maximum value R. On the contrary, when r<R, the same process can be done. Since this is a reverse process, the process in the compatible information reference unit 20 is rather complex, but can be easily inferred and is omitted.

The compatible information may be of two or more kinds. For example, in the case of a run length coder to be quantized, whether the compressed symbol is a quantized value or a run value is judged. Depending on the type of the compressed symbol, a form may use either the quantization example or the run example, as described above.

Figure 5:
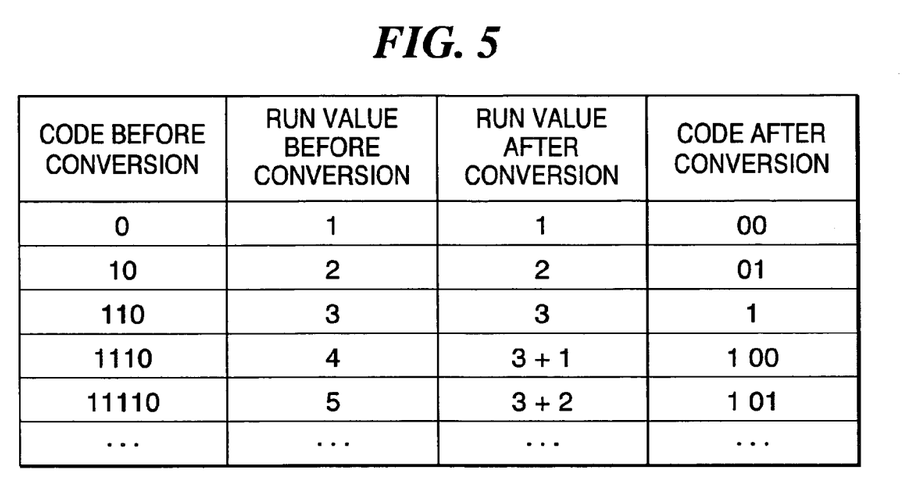
FIG. 5 is an explanatory view of assistance in explaining one example of compatible information of the code converter of the first embodiment of the present invention.

The compatible information is executed independently as described above, but may be combined. For example, the case where maximum run length conversion and codeword conversion are done by one LUT at the same time will be shown. FIG. 5 is an example of compatible information in such a case. Two middle sections showing the run values before and after conversion are added for description, and can be omitted in the actual structure. Only the run can be substituted by the abovementioned computation, but can be easily inferred and is omitted here. When the combination makes the process complex, the converting processes may be combined in multiple stages.

In the operation described above, the compressed symbol conversion unit 30 substitutes the compressed symbol based on the abovementioned compatible information. However, there is the case where the compressed symbols are not independent in the code data 110. For example, when the boundaries of the symbol and the codeword do not correspond with each other like an arithmetic code, a simple substituting process cannot implement application of the compatible information. In such a case, the compressed symbol conversion unit 30 may perform a decoding process and an encoding process.

For example, the case where the run length coder uses an arithmetic code for entropy encoding is considered. In the case of the abovementioned maximum run length conversion, the compressed symbol conversion unit 30 decodes an arithmetic code, and the obtained run value is subjected to the abovementioned substituting process, which is then arithmetic coded into the converted code data 130. In such a case, the run length code is not decoded and is processed as the compressed symbol. It is clear that this is a modification of the present invention.

Similarly, codeword conversion explained as the second example in the description of the compatible information actually needs a code cutting process in the compressed symbol conversion unit 30. This will be described in detail in a later embodiment.

For simplification, code conversion between two codes is described above. Code conversion between three or more codes can be performed likewise, except for the point that compatible information must be set to all the encoding intended for the compatible information. This can be easily inferred, and the description thereof is omitted. This is the same for the later embodiments.

Finally, the effect in the first embodiment of the present invention is estimated. Suppose that an original code data amount is S and a compressed symbol data amount with respect to this is S/R. Additions of a process for returning a compressed symbol to a non-compressed symbol, a process for substituting the symbol, and a process for returning the non-compressed symbol to the compressed symbol are indicated by L1, L2 and L3, respectively. Then, a process load is applied to the related art as follows:

$$La11 = S \times (L1 + L2 + L3) \quad (3)$$

Only the process load is required in the first embodiment of the present invention as follows:

$$La11 = S/R \times L2 \quad (4)$$

Considering that L1>L2 and L3>L2 are generally established, the effect of the embodiment of the present invention is clear.

As described above, according to the first embodiment of the present invention, the compressed symbol is compatible so as to convert a code on the compressed symbol. Data to be processed can be reduced. As a result, code conversion can be implemented by a small device at high speed.

[Second Embodiment]

As a first embodiment of the present invention, an example which embodies the present invention as an encoder will be described.

Figure 6:
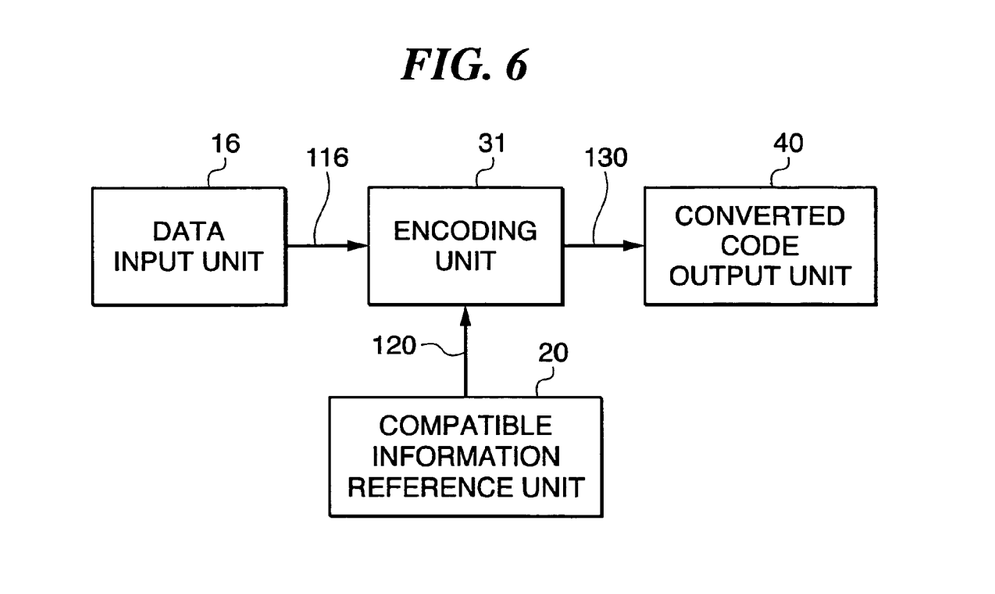
FIG. 6 is a block diagram showing an encoder of a second embodiment of the present invention.

A second embodiment of the present invention will be described specifically. FIG. 6 is a block diagram showing an encoder in the second embodiment of the present invention. In the drawing, the same parts as FIGS. 12 and 1 are indicated by similar numerals, and the description is omitted. The numeral 16 denotes a data input unit, the numeral 31 denotes an encoding unit, and the numeral 116 denotes input data.

The respective parts of FIG. 6 will be described. The data input unit 16 inputs data to be encoded from outside, which then sends out the input data 116 to the encoding unit 31.

The encoding unit 31 encodes the input data 116 by a predetermined method based on compatible information data 120, which then sends out the converted code data 130 to the code output unit 40.

The operation of the second embodiment of the present invention includes many similar points to that of the first embodiment, and only the difference will be described below. In the flowchart of the first embodiment described in FIG. 2, there is a difference in two points. In one of the points, the data input process in the data input unit 16 is substituted for the code input in S10. In the other point, the encoding process in the encoding unit 31 is substituted for the compressed symbol converting process in S30. The change of the two points becomes the operation of the second embodiment.

In the above-described operation, a difference between the compressed symbol conversion unit 30 of FIG. 1 and the encoding part 31 of FIG. 6 will be described. The compressed symbol conversion unit 30 converts the compressed symbols as already described. On the contrary, the encoding unit 31 converts the original data to the compressed symbol.

Compatible information at this time will be described next. In the above case, the compatible information data 120 supplies, to the encoding unit 31, information on what the compressed symbol with compatibility is. A code with a specified compressed symbol may be useful, and other codes may not be useful. For example, the compressed symbol which initializes a state variable possessed by the encoder is useful for a code having a state like an adaptive code, but is not useful for the non-adaptive code like the Huffman code. Similar examples include code table switching information and an error detection code. Here, the compressed symbol is called additional information.

The present invention can convert the same compressed symbol to a code in which additional information is useful or a code in which additional information is not useful. There are two ideas for designing the compatible information data 120. One is an idea in which additional information is included in the compressed symbol, and the other is an idea in which additional information is removed. The former can successfully use an additional information function in the code in which additional information is useful. The latter need not to encode excess overhead in the code in which additional information is unnecessary. Generally, when additional information is omitted in the code in which additional information is useful, the performance is lowered extremely. The former may be often preferable. When it is decided that no more code conversion is performed, the latter is more efficient. In either idea, information to be stored as the compressed symbol may be specified by the compatible information data 120.

This will be described more specifically. For example, in the former idea, the compressed symbol which initializes a state variable is specified as the compatible information data 120. Even when the encoding unit 31 cannot initialize a state variable in the encoding unit using Huffman encoding, this specification converts a state variable initializing compressed, symbol to the corresponding codeword, which is then outputted as the converted code data 130. In this case, the state variable initializing compressed symbol as the Huffman code is only overhead. However, when this is converted to a code in which state variable initializing is useful like an arithmetic code, an initializing function can enhance the compression ratio.

In the present invention, while considering the efficiency of the respective cases in conversion to each code to be envisaged, the compressed symbol must be designed. When a certain code lowers the efficiency more or less and improvement in other codes is large, such additional information is required as the compressed symbol. In the example described above, when the number of opportunities for conversion to the arithmetic code is extremely small and is not important, there may be a design in which the state variable initializing information is not included in the compressed symbol. Otherwise, the compatible information reference unit 20 is provided with a control part so that the abovementioned compressed symbol may be selected dynamically.

The relation between the compressed symbols before and after conversion like the compatible information in the first embodiment described in FIG. 3 or 5 need not be described into compatible information in the second embodiment. Only what symbol should be encoded may be described. When sharing it with the compatible information of the first embodiment, it may be done.

As described above, the second embodiment of the present invention performs encoding based on the compressed symbol to be compatible so as to implement easy code conversion and efficient encoding.

[Third Embodiment]

As a third embodiment of the present invention, an example in which the present invention is applied to a code converter of image encoding will be described. Taking the case of converting a codeword of the Huffman code of a multiple-value run length coder as an example, it will be described specifically.

Figure 7:
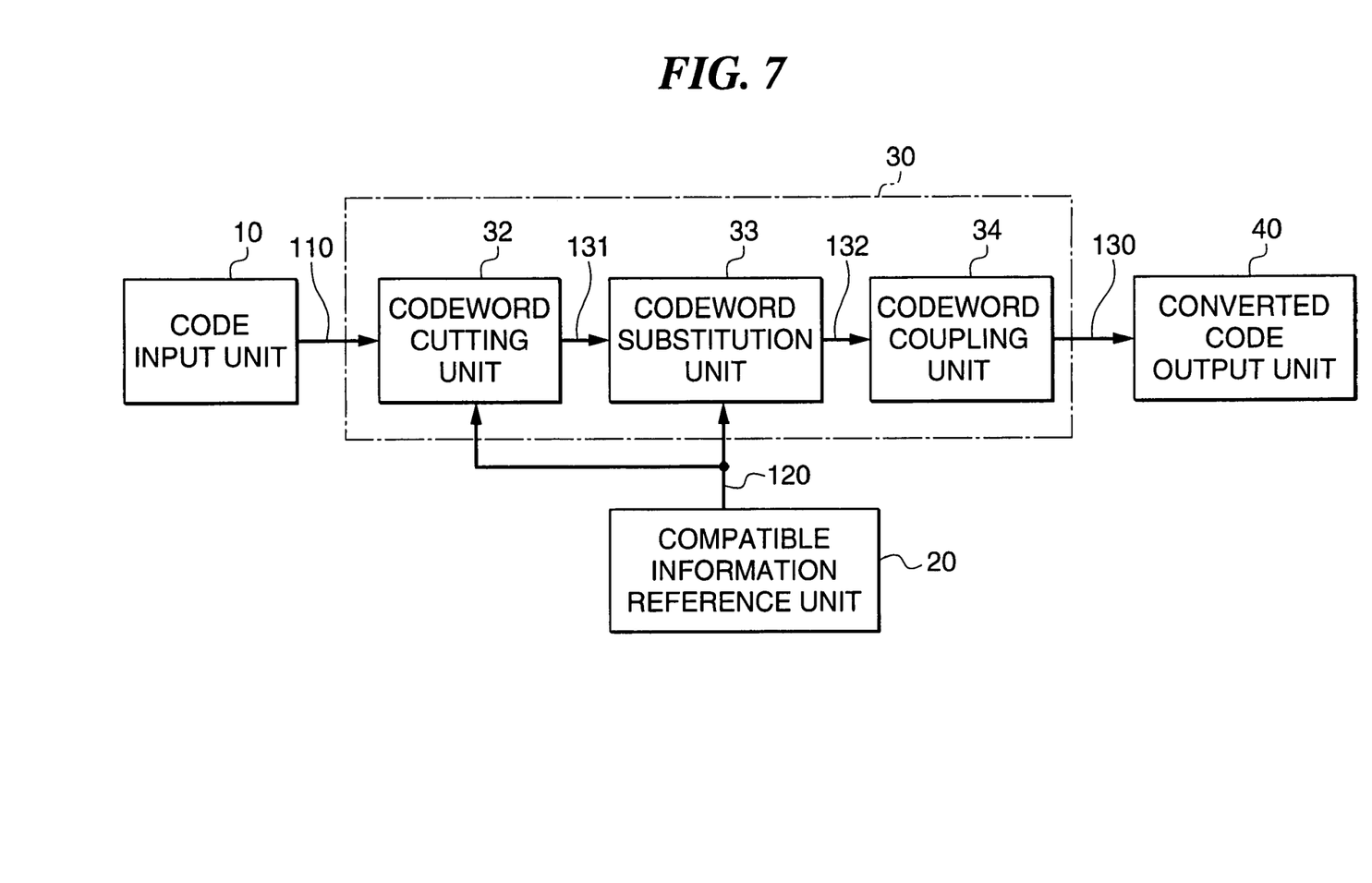
FIG. 7 is a block diagram showing a code converter of a third embodiment of the present invention.

The third embodiment of the present invention will be described specifically. FIG. 7 is a block diagram showing an image encoder of the third embodiment of the present invention. In the drawing, the same parts of FIGS. 12, 1 and 6 are indicated by similar numerals, and the description thereof is omitted. The numeral 32 denotes a codeword cutting unit, the numeral 33 denotes a codeword substitution unit, the numeral 34 denotes a codeword coupling unit, and the numerals 131 and 132 denote codeword data.

The respective parts of FIG. 7 will be described. The codeword cutting unit 32 cuts a codeword from input code data 110 based on compatible information data 120, which then sends out the codeword data 131 to the codeword substitution unit 33. The codeword substitution unit 33 substitutes the codeword data 131 based on the compatible information data 120, which then sends out the codeword data 132 to the codeword coupling unit 34. The codeword coupling unit 34 couples individual codeword data 134, which then sends out converted code data 130 to the converted code output unit 40.

Figure 8:
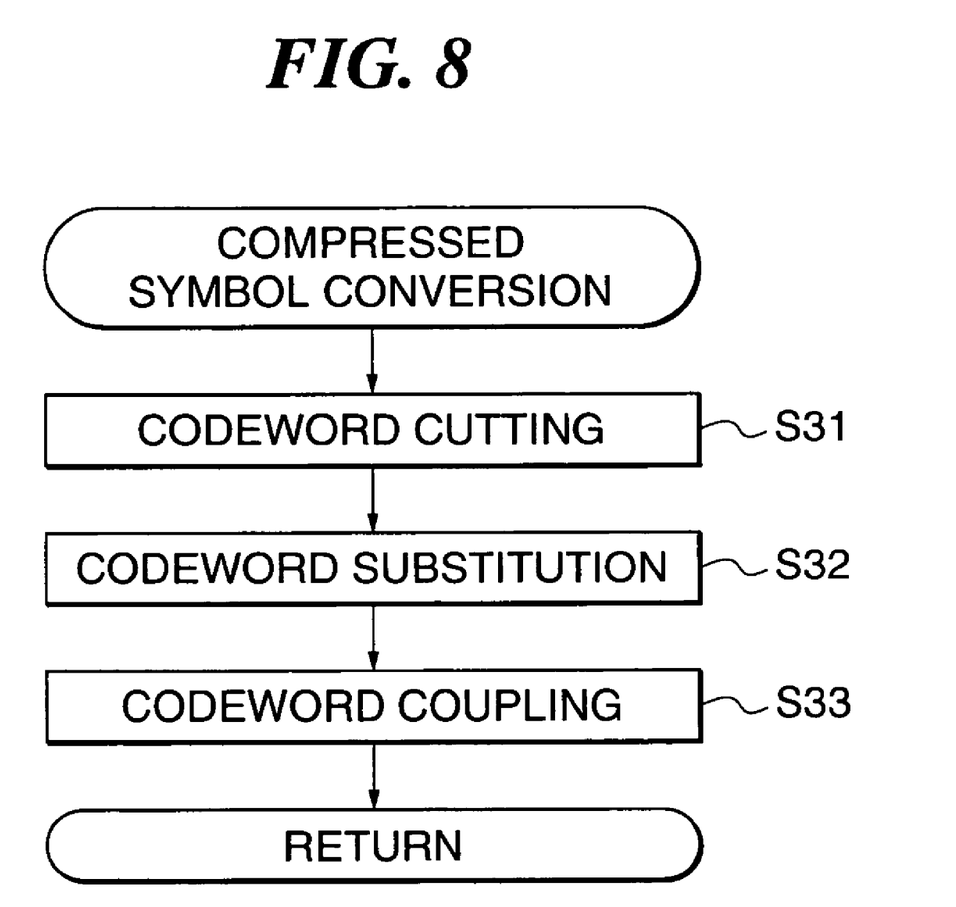
FIG. 8 is a flowchart showing one example of the operation of the code converter of the third embodiment of the present invention.

The operation of the third embodiment of the present invention will be described based on the above configuration. FIGS. 2 and 8 are flowcharts showing code converting operation in the third embodiment. In the drawing, the same parts as FIG. 13 are indicated by similar numerals, and the description thereof is omitted.

FIG. 2 is described in the first embodiment of the present invention. With FIG. 8, the process of the third embodiment in S30 of FIG. 2 will be described. In S31, the codeword cutting unit 32 cuts the codeword. In S32, the codeword substitution unit 33 substitutes the codeword. In S33, the codeword coupling unit 34 couples the codewords.

Figure 9A:
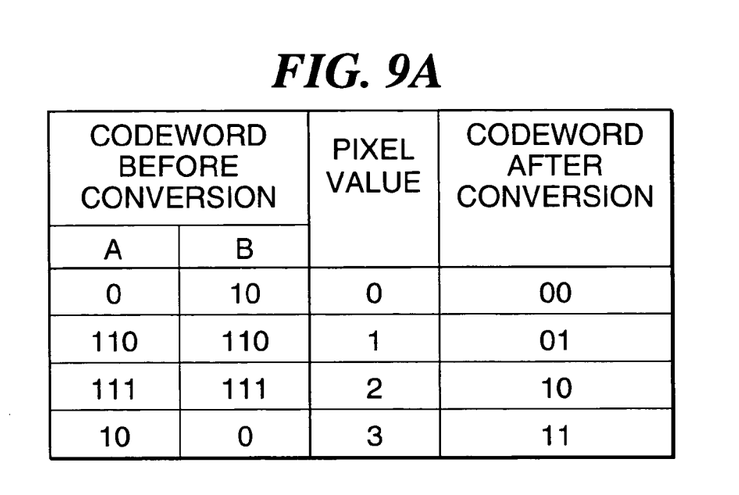
FIG. 9 is an explanatory view of assistance in explaining one example of compatible information of the code converter of the third embodiment of the present invention.
Figure 9B:
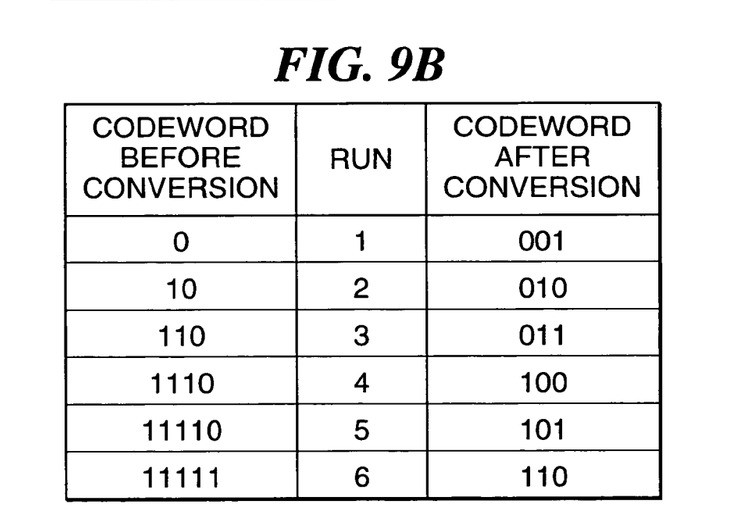
Figure 9C:
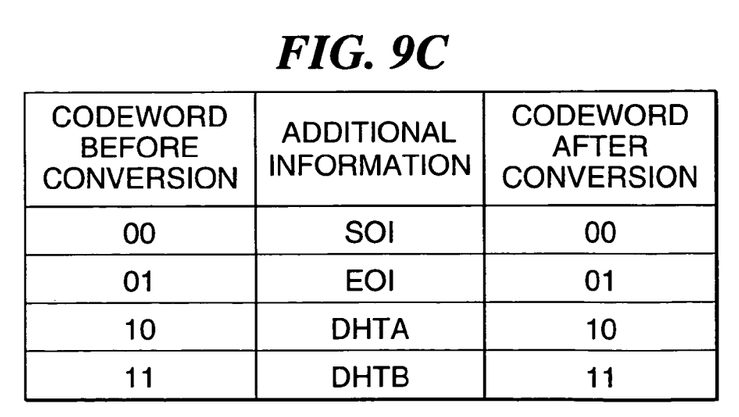

The compatible information data 120 in the above operation will be described. FIG. 9 is one example of compatible information in the third embodiment. The image encoding envisaged here is the multiple-value run length coder. An image is represented by alternately allowing a pixel value and its continuous length to be a codeword. The pixel value is four values from 0 to 3. When an image is aligned in a "3330000" form, the compressed symbol becomes "pixel value 3, run 3, pixel value 0, and run 4".

The example of FIG. 9 envisages that there is the following difference between two codes. First, a codeword before conversion puts emphasis on compression ratio and is designed by a variable length code. On the other hand, a codeword after conversion puts emphasis on processing speed and is designed by a fixed length code. The code before conversion can distinguish between two code tables of code tables A and B with respect to the pixel value. The code after conversion does not distinguish between them.

The meaning of additional information of FIG. 9 will be described. SOI shows the head of an image and EOI shows the end of the image. DHT changes a code with a pixel value in a code before conversion. DHTA uses the code table A. DHTB uses the code table B.

Similar to the example described in the first embodiment, the sections of "pixel value", "run", and "additional information" which are in the middle of each of the tables of FIG. 9 can be actually omitted.

Figure 10:
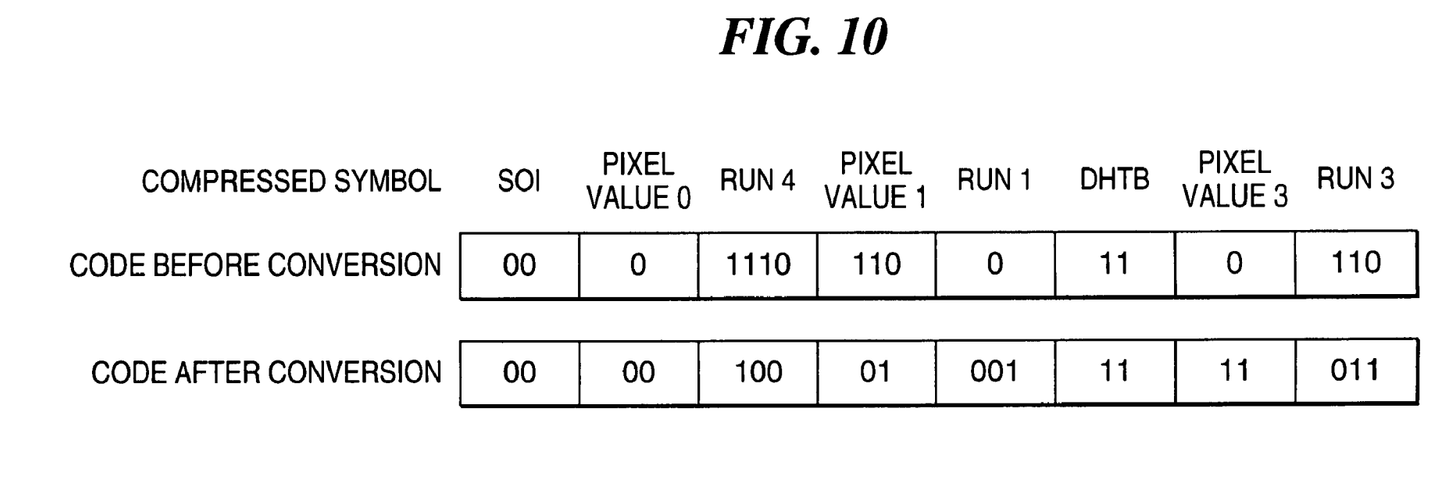
FIG. 10 is an explanatory view of assistance in explaining one example of codes before and after conversion of the code converter of the third embodiment of the present invention.

Under such envisagement, the code example of the third embodiment of the present invention will be described. FIG. 10 shows code examples before and after conversion. The pixel value and run codewords are found to be converted in accordance with the compatible information of FIG. 9. Due to the presence of DHTB as the sixth codeword, the seventh code before conversion requires only 1 bit.

The additional information DHTB of FIG. 10 is only overhead in the code after conversion. As described above, this is left as the code for later reconversion. If it is found that no more reconversion is performed, the DHTB may be omitted.

The example of the code converter is particularly described above. Similar to this, it can be applied to the encoder described in the second embodiment. The description is duplicated, and the detailed description thereof is avoided. In place of the codeword cutting unit 32 of FIG. 7, a block for generating a symbol from input data, that is, a source coder may be included.

As described above, according to the third embodiment of the present invention, high-speed code conversion by a small device which is an effect of the present invention can be applied to image encoding.

[Fourth Embodiment]

As a fourth embodiment of the present invention, an example in which the present invention is applied to an image output system will be described. There is envisaged a system in which two image output devices having different characteristics output the same image.

Figure 11:
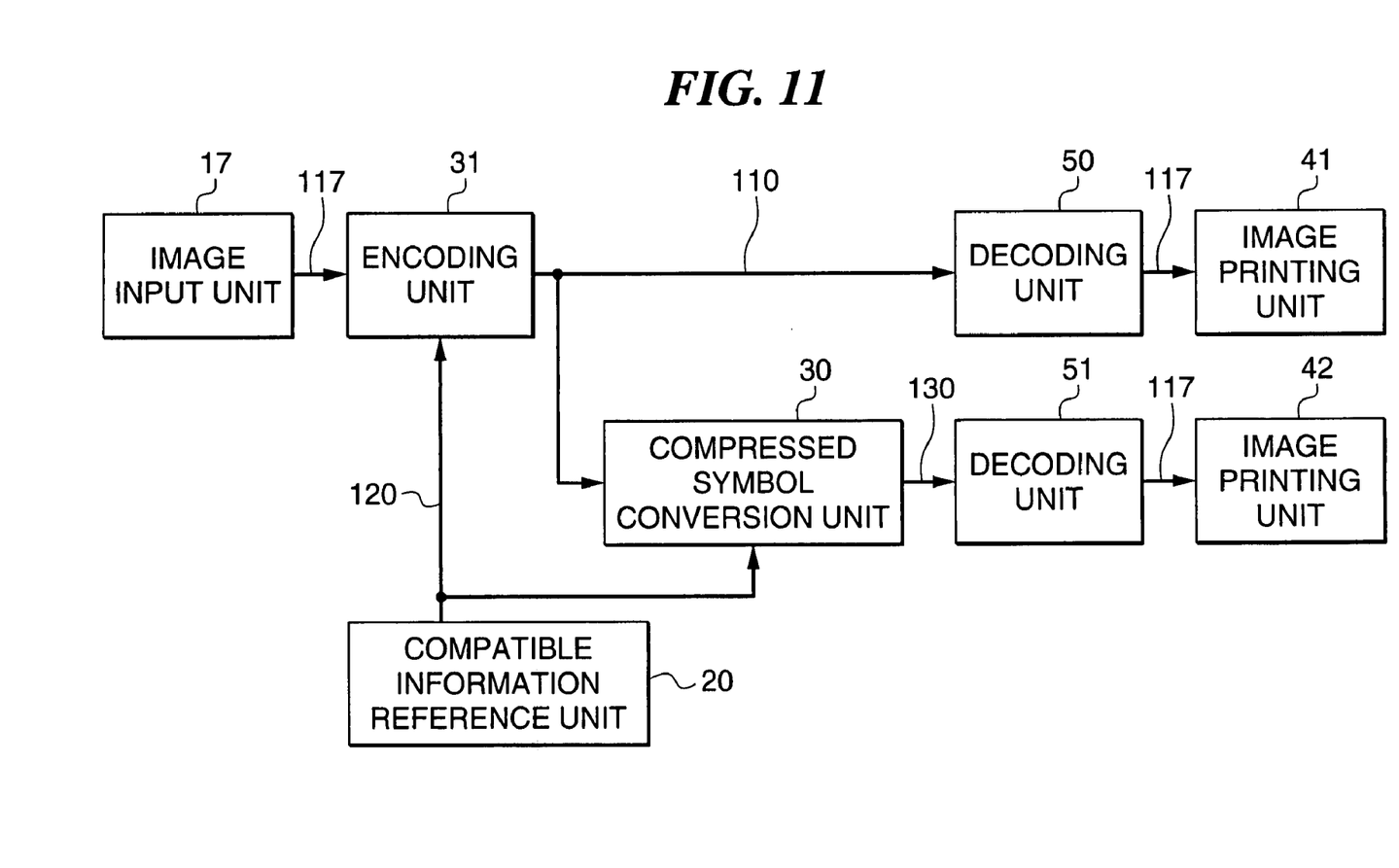
FIG. 11 is a block diagram showing an image output device of a fourth embodiment of the present invention.

The fourth embodiment of the present invention will be described specifically. FIG. 11 is a block diagram showing an image output device in the fourth embodiment of the present invention. In the drawing, the same parts as FIGS. 12, 1 and 6 are indicated by similar numerals, and the description thereof is omitted. The numeral 17 denotes an image input unit, the numerals 41 and 42 denote an image printing unit, the numerals 50 and 51 denote a decoding unit, and the numeral 117 denotes input image data.

The respective parts of FIG. 11 will be described. The image input unit 17 inputs an image from outside, which then sends out the input image data 117 to an encoding unit 30. The decoding units 50 and 51 decode input code data 110 and converted code data 130 by the respective predetermined methods, which then output the input image data 117 to the image output units 41 and 42. The image printing units 41 and 42 print the input image data 117.

The operation of the fourth embodiment of the present invention can be easily inferred from the description of other embodiments, and the description thereof is omitted.

In the above operation, the characteristics of the image printing units 41 and 42 are different. The term characteristic herein refers to the typical printing performance such as output resolution, output speed and output gradation. The name is a printing unit and includes not only a printing machine but also a printing device to paper such as a printer.

When the printing performances are different, requests to encoding are often different. For example, a first object is that compression ratio is enhanced in a high-speed output device. A more simplified algorithm may be required in a low-speed output device to reduce the cost. When the request cannot be implemented in the single encoding, the related art must prepare the respective codes to the same image or decode a code once to be re-encoded.

According to the fourth embodiment of the present invention, the input image data 117 is encoded in the encoding unit 30 with reference to the compatible information data 120. The input code data 110 can be a form which permits code conversion of the present invention. The compressed symbol conversion unit 30 is provided to convert the compressed symbol to a code matched with the printing performance of the image printing unit 42. This requires only one piece of original code data and can be outputted from plural image printing units without repeating decoding and encoding.

A very easy example is described here. A system which stores the input code data 110 or performs communication via a network can be also easily inferred. Further, a configuration is considered in which the converted code data 130 is transferred somewhere to be re-converted. The compatible information reference unit 20 may be prepared independently for the encoding unit 31 and the compressed symbol conversion unit 30. The fourth embodiment of the present invention is not limited to the configuration shown in FIG. 11.

As described above, in the fourth embodiment of the present invention, an image output system provided with plural image printing units permits high-speed code conversion by a small device which is an effect of the present invention. A single code can be outputted from the image printing units having different performances by a very easy process.

As is apparent from the above description, the present invention can implement conversion between different codes at high speed by a small device. In addition, this is applied to an encoder and an image output device to make the process efficient.

The entire disclosure of Japanese Patent Application No. 2001-270186 filed on Sep. 6, 2001 including specification, claims, drawings and abstract is incorporated herein by reference in its entirety.

What is claimed is:

1. A code converter comprising:
    a code input part which inputs a code;
    a compatible information reference part which refers to compatible information;
    a conversion part which converts the input code based on the compatible information; and
    a code output part which outputs a converting result of the conversion part,
    wherein, to ensure compatibility between at least two codes, a correspondence between compressed symbols before and after conversion is described into the compatible information, whereby the conversion part converts the symbols while keeping them compressed; and the conversion part comprises a codeword cutting part which cuts out a codeword from the input code, a codeword substitution part which substitutes the cut-out codeword, and a codeword coupling part which couples the codeword substituted by the codeword substitution part to generate a code.

2. The code converter according to claim 1, wherein the compatible information reference part comprises one of a look-up table and a multistage look-up table through virtual representation.

3. The code converter according to claim 1, wherein the compatible information reference part uses a predetermined relational expression to calculate a relation between the symbols by computation.

4. The code converter according to claim 1, wherein one of objects of code conversion is quantizing coefficient conversion, and the compatible information shows a relation between quantizing results by different quantizing coefficients.

5. The code converter according to claim 1, wherein one of objects of code conversion is codeword conversion, and the compatible information shows a relation between codewords in different codes.

6. The code converter according to claim 5, wherein the codeword is a Huffman code.

7. The code converter according to claim 1, wherein one of objects of code conversion is maximum run length conversion, and the compatible information shows a relation between run values in different maximum run lengths.

8. The code converter according to claim 1, wherein code conversion has plural objects, and the compatible information comprises parallelized or logically combined plural pieces of compatible information.

9. The code converter according to claim 1, wherein when symbols described into the compatible information are not independent on the code, the conversion part comprises a symbol cutting part which cuts out the described symbols.

10. The code converter according to claim 1, wherein even additional information is useful only for specific encoding, the additional information is described into the compatible information and included in a code.

11. The code converter according to claim 1, wherein additional information which is useful only for specific encoding is not described into the compatible information when it is known that no later code conversion is performed, and the additional information is removed from a code.

12. The code converter according to claim 1, wherein the compatible information reference part can change the compatible information to be described to control setting of the compatible information reference part according to a peripheral condition.

13. An encoder comprising:
a data input part which inputs data;
a compatible information reference part which refers to compatible information;
an encoding part which encodes the input data by a predetermined method based on the compatible information; and
a code output part which outputs an encoding result of the encoding part,
wherein a component of a compressed symbol to be encoded necessary to ensure compatibility between at least two codes is described into the compatible information, whereby the encoding part performs encoding which facilitates conversion; and
the encoding part comprises a symbol generation part which generates a symbol from the input data, a codeword substitution part which substitutes a codeword for the generated symbol, and a codeword coupling part which couples the codeword to generate a code.

14. A code converting method comprising the steps of:
inputting a code;
referring to compatible information showing a correspondence between codes to convert a code while keeping it compressed; and
outputting a converting result of a conversion part;
wherein, to ensure compatibility between at least two codes, a correspondence between compressed symbols before and after conversion is described into the compatible information, whereby the conversion part converts the symbols while keeping them compressed; and
the conversion part comprises a codeword cutting part which cuts out a codeword from the input code, a codeword substitution part which substitutes the cut-out codeword, and a codeword coupling part which couples the codeword substituted by the codeword substitution part to generate a code.

15. An encoding method comprising the steps of:
inputting data;
referring to compatible information including a component of a compressed symbol to be encoded necessary to ensure compatibility between at least two codes to encode the data; and
outputting an encoding result of an encoding part;
wherein the component of the compressed symbol to be encoded necessary to ensure compatibility between at least two codes is described into the compatible information, whereby the encoding part performs encoding which facilitates conversion; and
the encoding part comprises a symbol generation part which generates a symbol from the input data, a codeword substitution part which substitutes a codeword for the generated symbol, and a codeword coupling part which couples the codeword to generate a code.

16. A code converting method comprising:
inputting a code;
referring to compatible information;
converting the input code based on the compatible information; and
outputting a converting result of the conversion step,
wherein to ensure compatibility between at least two codes, a correspondence between compressed symbols before and after conversion is described into the compatible information, whereby the symbols are converted while being kept compressed; and
the conversion step comprises cutting out a codeword from the input code, substituting the cut-out codeword, and coupling the codeword substituted by the codeword substitution step to generate a code.

17. An encoding method comprising:
inputting data;
referring to compatible information;
encoding the input data by a predetermined method based on the compatible information; and
outputting an encoding result of the encoding step,
wherein a component of a compressed symbol to be encoded necessary to ensure compatibility between at least two codes is described into the compatible information, whereby the encoding step performs encoding which facilitates conversion; and the encoding step comprises generating a symbol from the input data, substituting a codeword for the generated symbol, and coupling the codeword to generate a code.

18. A storage medium readable by a computer, the storage medium storing a program of instructions executable by the computer to perform a function for converting a code, the function comprising the steps of:

inputting a code;

referring to compatible information;

converting the input code based on the compatible information; and outputting a converting result of the conversion step, wherein to ensure compatibility between at least two codes, a correspondence between compressed symbols before and after conversion is described into the compatible information, whereby the symbols are converted while being kept compressed; and the conversion step comprises cutting out a codeword from the input code, substituting the cut-out codeword, and coupling the codeword substituted by the codeword substitution step to generate a code.

19. A storage medium readable by a computer, the storage medium storing a program of instructions executable by the computer to perform a function for encoding which assumes later code conversion, the function comprising the steps of:

inputting data;

referring to compatible information;

encoding the input data by a predetermined method based on the compatible information; and outputting an encoding result of the encoding step, wherein a component of a compressed symbol to be encoded necessary to ensure compatibility between at least two codes is described into the compatible information, whereby encoding which facilitates conversion is performed in the encoding step; and the encoding step comprises generating a symbol from the input data, substituting a codeword for the generated symbol, and coupling the codeword to generate a code.

* * * * *